United States Patent
Leung et al.

(10) Patent No.: US 8,352,879 B2
(45) Date of Patent: Jan. 8, 2013

(54) METHOD FOR SWAPPING DISPLAY CONTENTS BETWEEN MULTIPLE SCREENS

(75) Inventors: Chee-Chun Leung, Tao Yuan Shien (TW); Ming-Chuan Hu, Taipei County (TW); Han-Hsing Ying, Taoyuan County (TW); Chun-Ming Hu, Tainan (TW); Li-Da Chen, Kaohsiung (TW)

(73) Assignee: Quanta Computer Inc., Tao Yuan Shien (TW)

( * ) Notice: Subject to any disclaimer, the term of this patent is extended or adjusted under 35 U.S.C. 154(b) by 251 days.

(21) Appl. No.: 12/959,450

(22) Filed: Dec. 3, 2010

(65) Prior Publication Data

US 2011/0296343 A1    Dec. 1, 2011

(30) Foreign Application Priority Data

May 28, 2010  (TW) .............................. 99117311 A

(51) Int. Cl.
*G06F 3/048* (2006.01)
(52) U.S. Cl. ......... 715/799; 715/781; 715/788; 715/802
(58) Field of Classification Search .................. 715/799, 715/781, 788, 802
See application file for complete search history.

(56) References Cited

U.S. PATENT DOCUMENTS

| | | | | |
|---|---|---|---|---|
| 6,917,348 | B2 * | 7/2005 | Demsky et al. | 345/1.1 |
| 8,032,832 | B2 * | 10/2011 | Russ et al. | 715/731 |
| 8,095,887 | B2 * | 1/2012 | Lee et al. | 715/788 |
| 8,154,473 | B2 * | 4/2012 | Engel et al. | 345/4 |
| 2011/0113486 | A1 * | 5/2011 | Hunt et al. | 726/19 |
| 2012/0194487 | A1 * | 8/2012 | Roethig et al. | 345/204 |

\* cited by examiner

*Primary Examiner* — David Phantana Angkool
(74) *Attorney, Agent, or Firm* — Rabin & Berdo, P.C.

(57) ABSTRACT

A method for swapping display contents between a first and a second screen. The first screen is a primary screen. A window is displayed on one of the first and the second screen. The method includes: calculating a window movement distance according to a relative position between the first and the second screen; performing swapping to set the second screen as the primary screen; obtaining a coordinate of the window after swapping; obtaining a first coordinate by adding the window movement distance to the coordinate of the window after swapping if the window is located in the first screen before swapping; obtaining a second coordinate by subtracting the window movement distance from the coordinate of the window after swapping if the window is located in the second screen before swapping; moving the window from one of the first and the second screen to the other.

8 Claims, 6 Drawing Sheets

METHOD FOR SWAPPING DISPLAY CONTENTS BETWEEN MULTIPLE SCREENS

This application claims the benefit of Taiwan application Serial No. 99117311, filed May 28, 2010, the subject matter of which is incorporated herein by reference.

BACKGROUND OF THE INVENTION

1. Field of the Invention

The invention relates in general to a method for swapping display contents between multiple screens.

2. Description of the Related Art

Windows operating system can support multiple screens under "extension mode", in which only one screen is set by the operating system as a primary screen identified as no. 1, and the other screens are set as secondary screens identified as no. 2 and so on.

The user can set either of the two screens as the primary screen. The setting of primary screen mainly affects the position of task bar and the definition of coordinate system. In the Windows operating system, the task bar is always fixed on primary screen. As to the coordinate system, the top left corner of the primary screen is defined as origin (0, 0), and the coordinate system of other screen (i.e., secondary screen) is defined with reference to the relative position between the primary screen and the secondary screen and the resolution of the secondary screen. It has to be noted that there is only one coordinate system for accommodating the two screens, but the origin of the coordinate system would be shifted to the top left corner of new primary screen.

FIG. 1A and FIG. 1B show "swapping primary screen" according to prior art. As indicated in FIG. 1A, two windows P1 and P2 are on the screen M1, and a window P3 is on the screen M2. Since the screen M1 is the primary screen, the task bar 110 is displayed on the screen M1 (the primary screen). Supposing that the user performs "swapping primary screen", i.e. set the screen M2 as the primary screen, the task bar 110 will be displayed on the screen M2 (the primary screen, at present) as indicated in FIG. 1B. However, after swapping, the windows P1, P2 are still displayed on the screen M1, and the window P3 is still displayed on the screen M2. In other words, the windows P1, P2, P3 do not change their position after swapping, so the user has to manually drag the windows P1 and P2 to the new primary screen (the screen M2). Thus, there is a lot of improvement.

SUMMARY OF THE INVENTION

Examples of the invention are directed to a method for swapping display contents between multiple screens. When swapping, the window position will be moved accordingly, the window originally displayed on the original primary screen will be moved to the new primary screen, and the window originally displayed on the original secondary screen will be moved to the new secondary screen, so as to provide the user with more convenience.

An embodiment of the present invention provides a method for swapping display contents between a first screen and a second screen. The first screen is a primary screen. A window is displayed on one of the first screen and the second screen. The method includes: (a) calculating a window movement distance according to a relative position between the first screen and the second screen; (b) performing swapping to set the second screen as the primary screen; (c) obtaining a coordinate of the window after swapping; (d) obtaining a first coordinate by adding the window movement distance to the coordinate of the window after swapping if the window is located in the first screen before swapping; (e) obtaining a second coordinate by subtracting the window movement distance from the coordinate of the window after swapping if the window is located in the second screen before swapping; and (f) moving the window from one of the first screen and the second screen to the other according to the first coordinate or the second coordinate.

Another embodiment of the present invention provides a method for swapping display contents between multiple screens. The method includes: (a) receiving a swapping instruction to perform swapping; (b) identifying a relative position between the screens and respective resolution of each screen; (c) recording an original display sequence of the viewable windows displayed; (d) moving the viewable windows displayed; and (e) setting the moved viewable windows according to the recorded respective original display sequence.

The above and other aspects of the invention will become better understood with regard to the following detailed description of the preferred but non-limiting embodiment(s). The following description is made with reference to the accompanying drawings.

DETAILED DESCRIPTION OF THE INVENTION

According to an embodiment of the invention, in a multi-screen system, while performing "swapping primary screen" (which will be referred to hereinafter as "swapping") to swap display contents, the positions of the windows will move accordingly. The swapping means to select a originally non-primary screen as new primary screen, for example, setting the originally secondary screen as new primary screen, thus, the originally primary screen become non-primary screen such as a new secondary screen. In the same time, according the invention, the window originally displayed on the original primary screen will move to a new primary screen instead of displaying on the original primary screen, and the window originally displayed on the original secondary screen will also move to a new secondary screen. In the following disclosure, "the original primary screen" denotes the primary screen before swapping and "the original secondary screen" denotes the secondary screen before "swapping". Likewise, "the new primary screen" denotes the primary screen after swapping and "the new secondary screen" denotes the secondary screen after swapping.

Figure 1A:
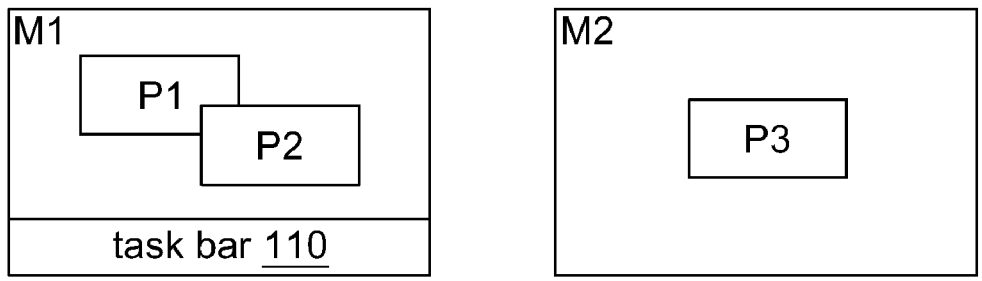
FIG. 1A and FIG. 1B show swapping primary screen according to prior art.
Figure 1B:
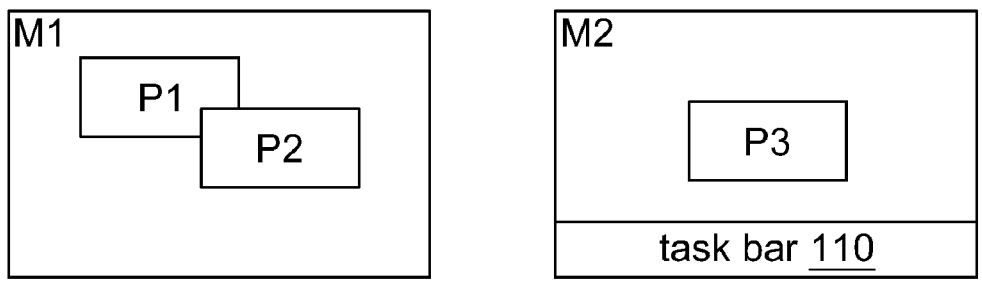
Figure 2A:
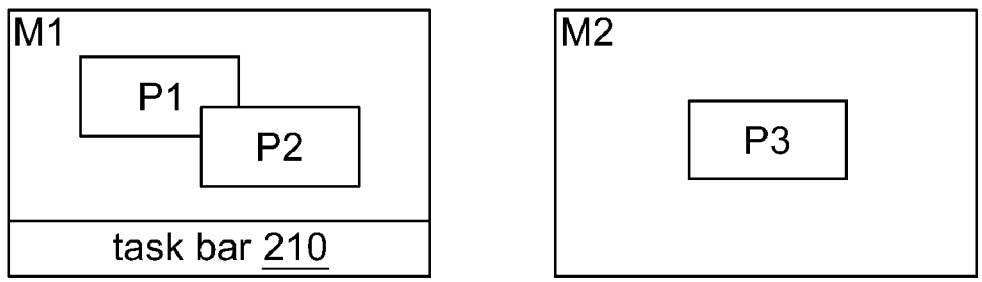
FIG. 2A and FIG. 2B show swapping primary screen according to an embodiment of the invention.
Figure 2B:
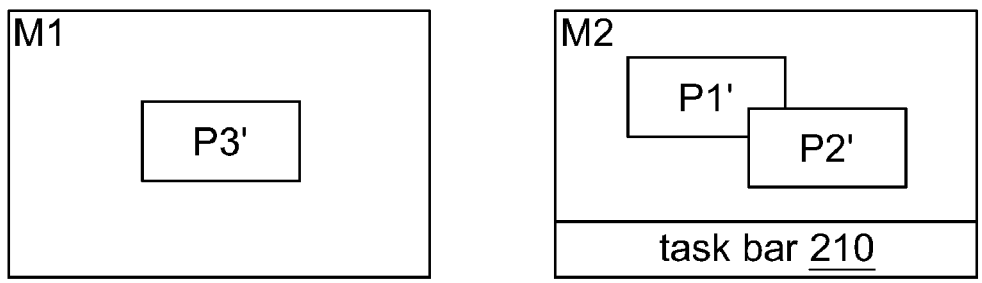

FIG. 2A and FIG. 2B show "swapping" according to an embodiment of the invention. As indicated in FIG. 2A, two windows P1 and P2 are on the screen M1, and a window P3 is on the screen M2. Suppose the screen M1 as the primary screen, thus the task bar 210 is displayed on the screen M1.

Then, the user performs "swapping", i.e., sets the screen M2 as the new primary screen. The task bar 210 would be moved from the screen M1 and displayed on the screen M2 (the new primary screen) as indicated in FIG. 2B. According to the embodiment of the invention, after swapping, the windows P1 and P2 originally displayed on the original primary screen M1 are moved to the new primary screen M2 as windows P1' and P2'; and the window P3 originally displayed on the original secondary screen M2 is moved to the new secondary screen M1 as window P3'.

Figure 3A:
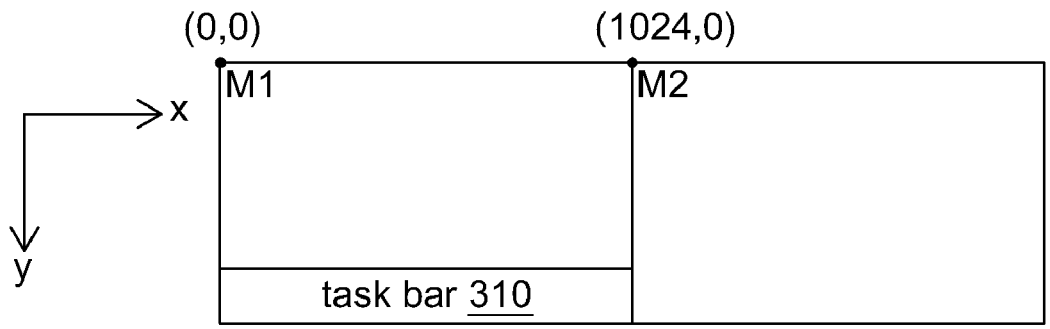
FIG. 3A~FIG. 3D show a relative position between two screens and their respective coordinates at top left corner under an extension mode.
Figure 3B:
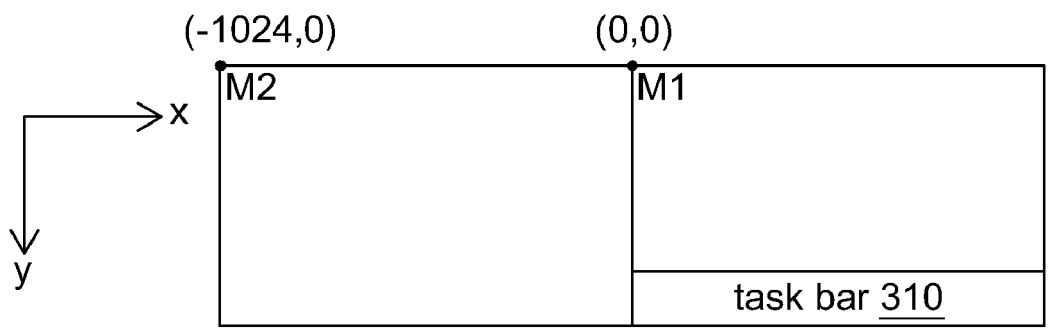
Figure 3C:
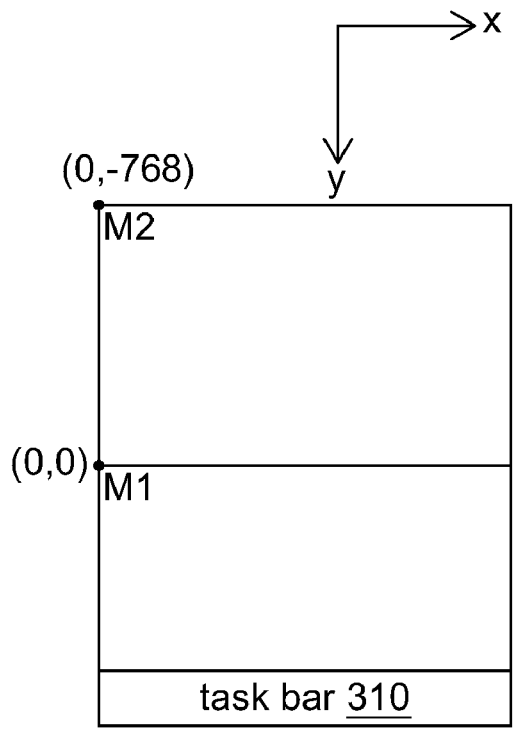
Figure 3D:
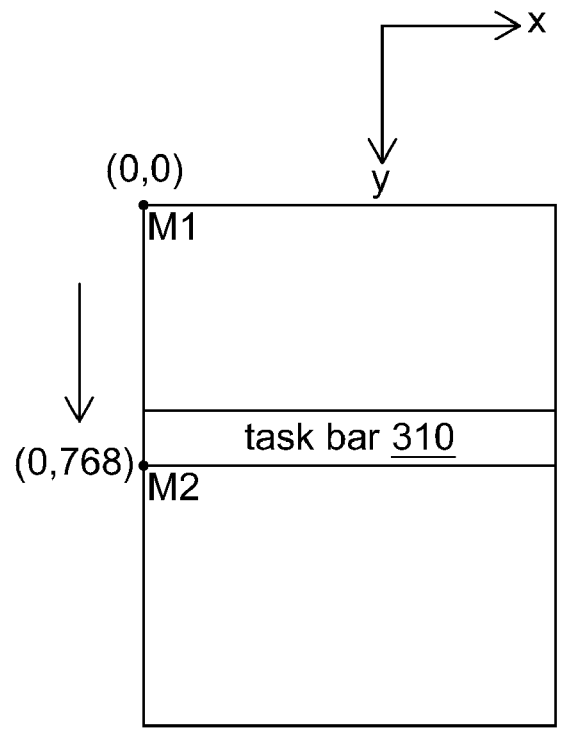

"Swapping", according to the embodiment of the invention, is disclosed below. In the embodiment of the invention, a two-screen system is exemplified. However, anyone who is skilled in the technology of the invention will understand that the invention has other embodiments applicable to more than two screens. Referring to FIG. 3A~FIG. 3D, a relative position between two screens (the primary screen and the secondary screen) and top left corner coordinates under extension mode are shown. Suppose that the resolutions of all screens are 1024*768, the screen M1 is the original primary screen, and the screen M2 is the original secondary screen. Under Windows operating system, the coordinate at the top left corner of the primary screen is defined as origin (0, 0). As indicated in FIG. 3A, the original primary screen M1 is located left of the original secondary screen M2, the coordinate at the top left corner of the original primary screen M1 is (0, 0), and the coordinate at the top left corner of the original secondary screen M2 is (1024, 0). As indicated in FIG. 3B, the original primary screen M1 is located right of the original secondary screen M2, the coordinate at the top left corner of the original primary screen M1 is (0, 0), and the coordinate at the top left corner of the original secondary screen M2 is (−1024, 0). As indicated in FIG. 3C, the original primary screen M1 is located underneath the original secondary screen M2, the coordinate at the top left corner of the primary screen M1 is (0, 0), and the coordinate at the top left corner of the original secondary screen M2 is (0,−768). As indicated in FIG. 3D, the original primary screen M1 is located atop of the original secondary screen M2, the coordinate at the top left corner of the original primary screen M1 is (0, 0), and the coordinate at the top left corner of the original secondary screen M2 is (0, 768).

Figure 4A:
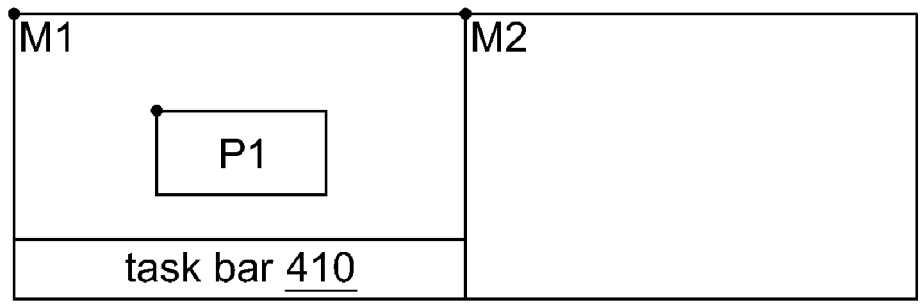
FIG. 4A~FIG. 4C show the moving of a window according to the embodiment of the invention.
Figure 4B:
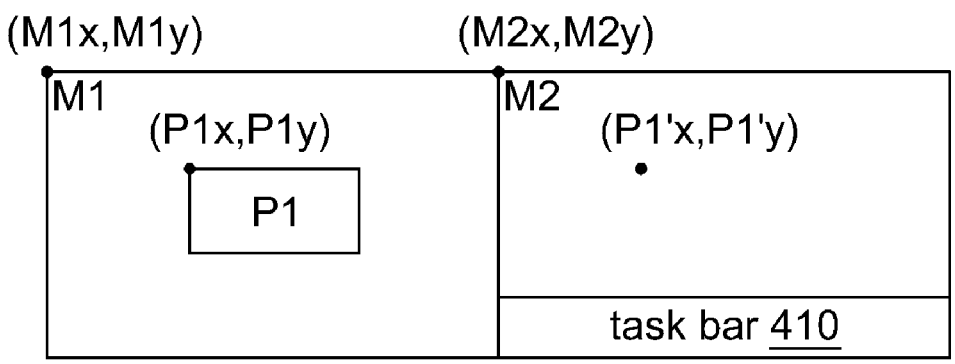
Figure 4C:
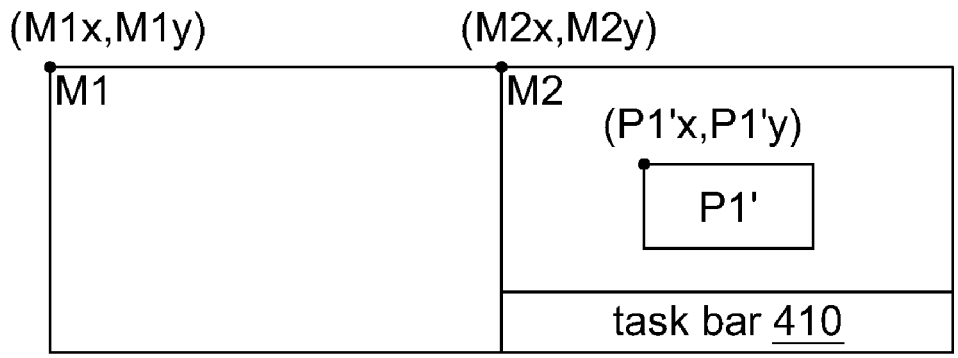

FIG. 4A~FIG. 4C show moving of the window according to the embodiment of the invention. Referring to FIG. 4A. Supposing there are two screens M1 and M2, the screen M2 is located right of the screen M1, the screen M1 is the original primary screen (thus, the task bar 410 is displayed on the primary screen M1), and the screen M2 is the original secondary screen. A window P1 is on the primary screen M1. Before swapping, the coordinate at the top left corner of the window P1 is (P1$x$, P1$y_{(BS)}$) in the coordinate system whose origin is at the top left corner of the original primary screen M1, wherein BS stands for "before swapping".

After performing "swapping primary screen", the screen M2 becomes new primary screen (thus, the task bar 410 is moved to be displayed on the new primary screen M2) and the screen M1 becomes new secondary screen, wherein the relative position between the screens M1 and M2 remains unchanged. The coordinate at the top left corner of the window P1 becomes (P1$x$, P1$y_{(AS)}$) on the new screen screen M1 based on the coordinate system whose origin is changed to the top left corner of the new primary screen M2 from the original primary screen M1 after swapping, wherein AS stands for after swapping.

Then, a distance, "window movement distance", is calculated. Let FIG. 4A to FIG. 4C be taken for example. The window P1 would be moved the distance (i.e. window movement distance) to the new position as the window P1'. The window movement distance is the width of the original primary screen (M1), which can be represented as the difference between the x coordinate of the top left corner of the original secondary screen (M2) and the x coordinate of the top left corner of the original primary screen (M1). In the present embodiment of the invention, the window movement distance is defined as the difference between the respective top left corners of the original secondary screen and the original primary screen:

$$\Delta x = M1\_width = M2x_{(BS)} - M1x_{(BS)} \tag{1A}$$

$$\Delta y = M1\_height = M2y_{(BS)} - M1y_{(BS)} \tag{1B}$$

In the above formulas, $\Delta x$ and $\Delta y$ respectively denote the x component and the y component of the window movement distance; M1_width denotes the width of the original primary screen; M1_height denotes the height of the original primary screen; M2$x_{(BS)}$ and M2$y_{(BS)}$ respectively denotes the x coordinate and the y coordinate at the top left corner of the original secondary screen before swapping; M1$x_{(BS)}$ and M1$y_{(BS)}$ respectively denotes the x coordinate and the y coordinate at the top left corner of the original primary screen before swapping.

The process of obtaining the new position or coordinate of the window is disclosed below. Before moving the window, whether the window is displayed on the original primary screen or on the original secondary screen before "swapping" is judged. If the window is displayed on the original primary screen before swapping, then the new position of the window is obtained by adding the window movement distance to the coordinate at the top left corner of the window when the origin is shifted to the top left corner of the new primary screen. Likewise, if the window is displayed on the original secondary screen before swapping, then the new position of the window is obtained by subtracting the window movement distance from the coordinate at the top left corner of the window when the origin is shifted to the top left corner of the new primary screen.

Supposing the resolutions of the screens M1 and M2 both are 1024*768; the screen M1 is the original primary screen, and the coordinate at the top left corner of the screen M1 is (0, 0); the screen M2 is the original secondary screen, and the coordinate at the top left corner of the screen M2 is (1024, 0); the coordinate (P1$x$, P1$y_{(BS)}$) at the top left corner of the window P1 before swapping is (100,100) in the coordinate system whose origin is at the top left corner of the original primary screen M1. After "swapping", the screen M2 becomes new primary screen and the screen M1 becomes new secondary screen, so that the origin of the coordinate is changed to the top left corner of the new primary screen M2, thus, the coordinate at the top left corner of the new secondary screen M1 becomes (−1024, 0), the coordinate (P1$x$, P1$y_{(AS)}$) at the top left corner of the window P1 becomes (−924, 100).

The window movement distance can be calculated according to the above formulas (1A) and (1B):

$$\Delta x = M2x_{(BS)} - M1x_{(BS)} = (1024 - 0) = 1024;$$

$$\Delta y = M2y_{(BS)} - M1y_{(BS)} = (0 - 0) = 0.$$

Then, whether the window P1 is located in the original primary screen or the original secondary screen before swapping is judged. In the present embodiment of the invention, the window P1 is located in the original primary screen M1 before swapping, so the new position (P1'$x$, P1'$y$) of the window P1' on the new primary screen M2 can be obtained by adding the window movement distance (1024, 0) to the coordinate (−924, 100) of (P1x, P1y$_{(AS)}$) at the top left corner of the window P1.

$$P1'x = P1x_{(AS)} + \Delta x = -924 + 1024 = 100;$$

$$P1'y = P1y_{(AS)} + \Delta y = 100 + 0 = 100.$$

Thus, the coordinate of the window P1' is (100, 100), and is consistent with the coordinate (100, 100) before swapping.

Then, as indicated in FIG. 4C, the window P1 is moved a distance of window movement distance to the new primary screen M2. Thus, as the user performs "swapping primary screen", the window originally located on the original primary screen is moved to the new primary screen accordingly, and the coordinate of the window after swapping is the same with that before swapping.

In another embodiment of the application, in which the screens M1 and M2 are vertically arranged. Supposing that the resolutions of the screens M1, M2 are both 1024*768; the screen M1 is the original primary screen, and the coordinate at the top left corner of the screen M1 is (0, 0); the screen M2 is the original secondary screen, and the coordinate at the top left corner of the screen M2 is (0, 768). The coordinate (P1x, P1y$_{(BS)}$) at the top left corner of the window P1 before swapping is (100,868), that is, the window P1 is located in the original secondary screen M2 before swapping.

After "swapping", the screen M2 becomes new primary screen and the coordinate at the top left corner of the new primary screen M2 becomes (0, 0), thus, the coordinate at the top left corner of the new secondary screen M1 becomes (0,−768), and the coordinate (P1x, P1y$_{(AS)}$) at the top left corner of the window P1 becomes (100, 100).

Then, the window movement distance is calculated according to formulas (1A) and (1B) as:

$$\Delta x = M2x_{(BS)} - M1x_{(BS)} = 0 - 0 = 0;$$

$$\Delta y = M2y_{(BS)} - M1y_{(BS)} = 768 - 0 = 768.$$

Then, whether the window P1 is located in the original primary screen or the original secondary screen before swapping is judged. In the present embodiment of the invention, the window P1 is located in the original secondary screen before swapping, then the new position (P1'x, P1'y) is obtained by subtracting the window movement distance (0, 768) from the coordinate (100, 100) of (P1x, P1y$_{(AS)}$) at the top left corner of the window P1:

$$P1'x = P1x - \Delta x = 100 - 0 = 100;$$

$$P1'y = P1y - \Delta y = 100 - 768 = -668.$$

After the window P1 is moved a distance of window movement distance to the new secondary screen M1 from the original secondary screen M2 as the window P1', the coordinate at the top left corner of the window P1' becomes (100,−668). Thus, as the user performs "swapping primary screen", the window P1 is moved to the new secondary screen accordingly.

The way of moving the window is summarized as follow: Supposing the screen M1 is the original primary screen and the screen M2 is the original secondary screen. After "swapping", the screen M2 becomes new primary screen and the screen M1 becomes new secondary screen. The coordinate at the top left corner of the window P, originally displayed on the original primary screen M1, is (Px, Py$_{(BS)}$) in the coordinate system whose origin is at the top left corner of the original primary screen M1 before swapping; and the coordinate at the top left corner of the window becomes (Px, Py$_{(AS)}$) in the coordinate system whose origin is changed to the top left corner of the new primary screen M2 after swapping. Then, the window P is moved from the original primary screen M1 to the new primary screen M2 as the window P'. Thus, the coordinate at the top left corner of the window P' in the coordinate system whose origin is at the top left corner of the new primary screen M2 is represented as:

$$P'x = Px_{(AS)} + M1\_width = Px_{(AS)} + (M2x - M1x)$$

$$P'y = Py_{(AS)} + M1\_height = Py_{(AS)} + (M2y - M1y)$$

M1_width denotes the width of the original primary screen M1, M1_height denotes the height of the original primary screen M1; M2x and M2y respectively denote the x coordinate and the y coordinate at the top left corner of the original secondary screen before swapping; M1x and M1y respectively denotes the x coordinate and the y coordinate at the coordinate at the top left corner of the original primary screen before swapping.

Supposing that, before swapping, the window P is displayed on the original secondary screen M2, and the coordinate at the top left corner of the window P is (Px, Py$_{(BS)}$) in the coordinate system whose origin is at the top left corner of the original primary screen M1. After swapping, the coordinate at the top left corner of the window P becomes (Px, Py$_{(AS)}$) in the coordinate system whose origin is changed to the top left corner of the new primary screen M2. Then, the window P is moved to the new secondary screen M1 as the window P'. Thus, the coordinate at the top left corner of the window P' in the coordinate system whose origin is at the top left corner of the new primary screen M2 is represented as:

$$P'x = Px_{(AS)} - M1\_width = Px_{(AS)} - (M2x - M1x)$$

$$P'y = Px_{(AS)} - M1\_height = Py_{(AS)} - (M2y - M1y)$$

Likewise, if the primary screen and the secondary screen are vertically arranged, how to move the window can be obtained in the same manner. In addition, the embodiment of the invention can also be applied to the scenario when the resolution of the screen M1 is different from that of the screen M2.

Figure 5A:
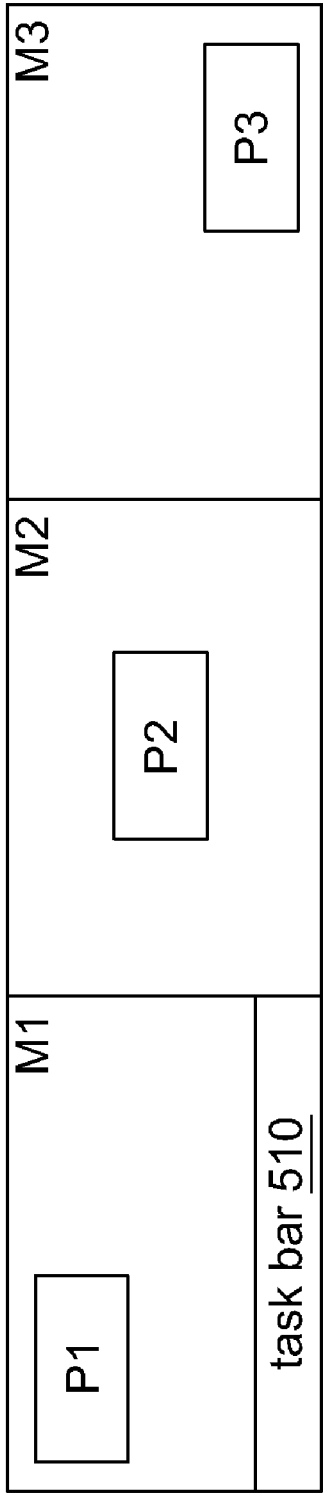
FIG. 5A and FIG. 5B show how the embodiment of the invention is applied in three screens.
Figure 5B:
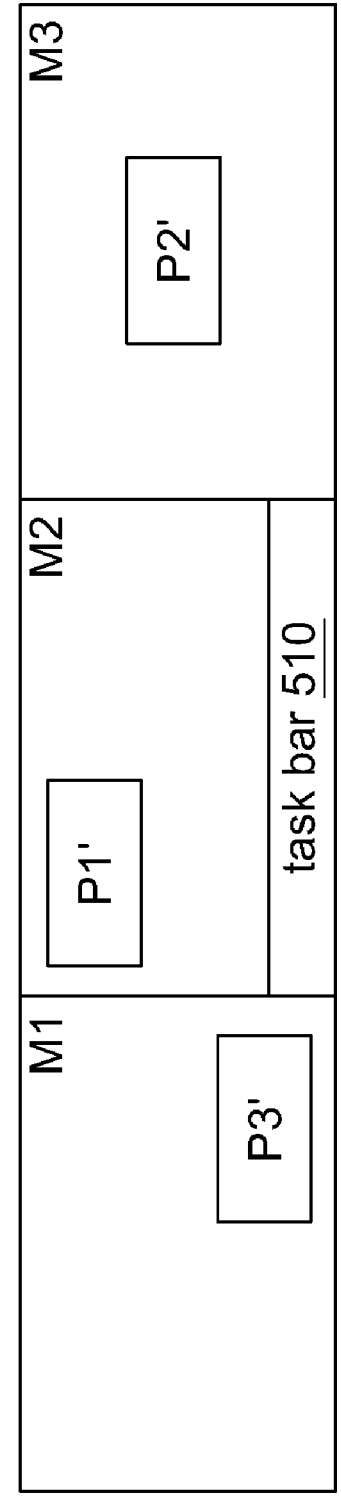

Furthermore, the embodiment of the invention can also be applied to multi-screen system. FIG. 5A and FIG. 5B show that the embodiment of the invention is applied to a three-screen system. Supposing there are three screens M1~M3 whose relative positions are indicated in FIG. 5A. The windows P1~P3 are respectively displayed on the screens M1~M3, wherein the screen M1 is the original primary screen (the task bar 510 is displayed on the screen M1), and the screens M2 and M3 are secondary screens. After swapping, the screen M2 is set as new primary screen (thus, the task bar 510 is displayed on the screen M2), and the screens M1 become a secondary screen and the screen M3 remains a secondary screen. The window P1 is moved to the screen M2 from the screen M1 as the window P1'. The window P2 is moved to the screen M3 from the screen M2 as the window P2'. The window P3 is moved to the screen M1 from the screen M3 as the window P3'. The moving of the window is not limited to the above exemplification as long as all viewable windows originally displayed on the original primary screen can be moved to the new primary screen after swapping. The coordinates at the top left corner of the windows P1'~P3' are respectively obtained according to the above formulas.

In the embodiment of the invention, whether each window is "viewable" is judged first. A viewable window refers to a window that is viewable to the user, and if a window is not a viewable window, which would not be moved for saving computing resources.

Besides, windows can be classified into maximized window, minimized window, and normal window. For moving a normal window to a new position, refer to the above disclosure. However, if the window is a maximized window or a minimized window, the window needs to be restored as a normal window, then moving the restored normal window according to the above disclosure; finally, the moved window is restored again as the original maximized window or the original minimized window. Thus, if the user restores the maximized window or the minimized window to a normal window, the normal window will be displayed on the correct screen rather than on its original screen.

Figure 6A:
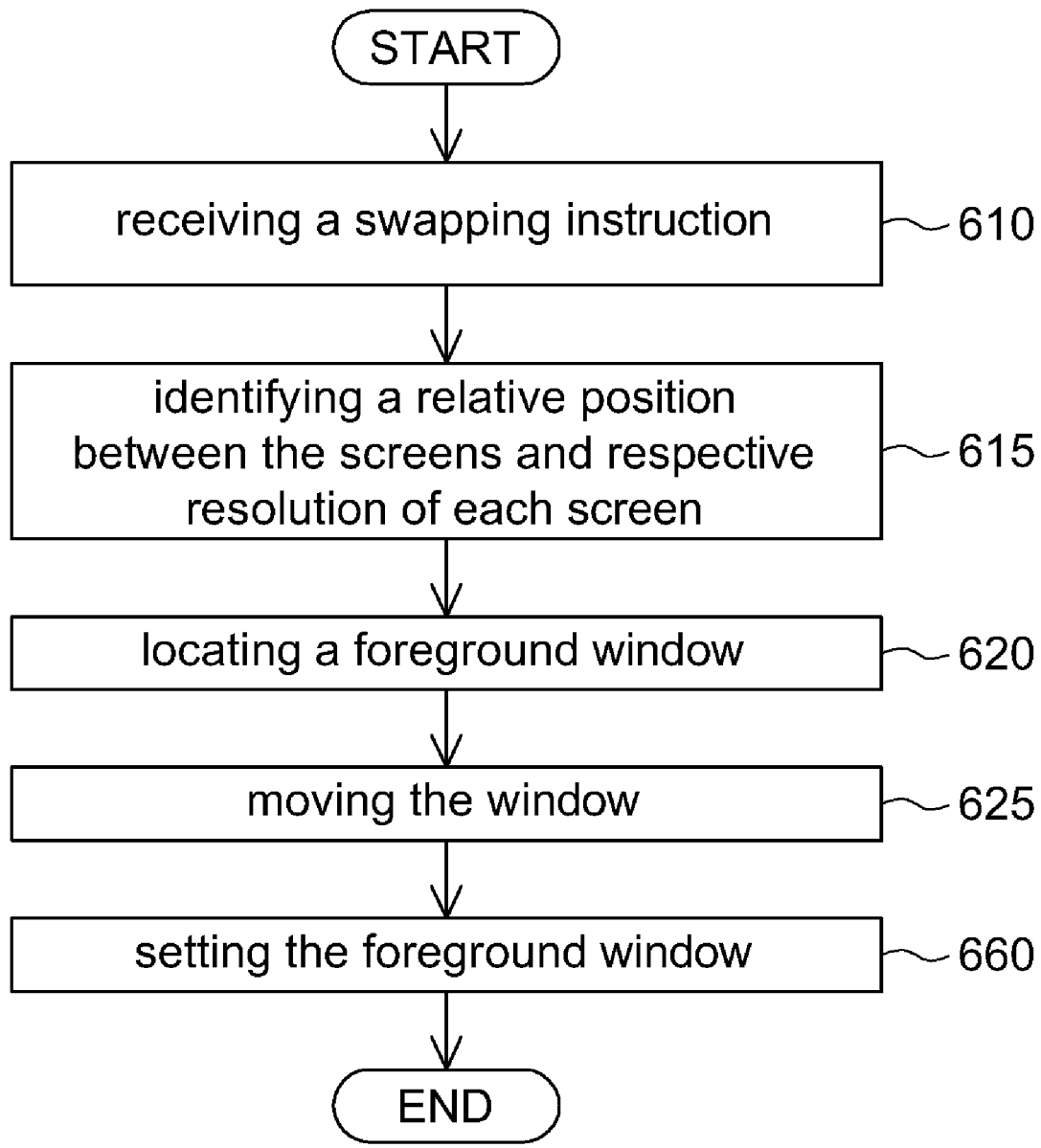
FIG. 6A and FIG. 6B show an operating process according to the embodiment of the invention.
Figure 6B:
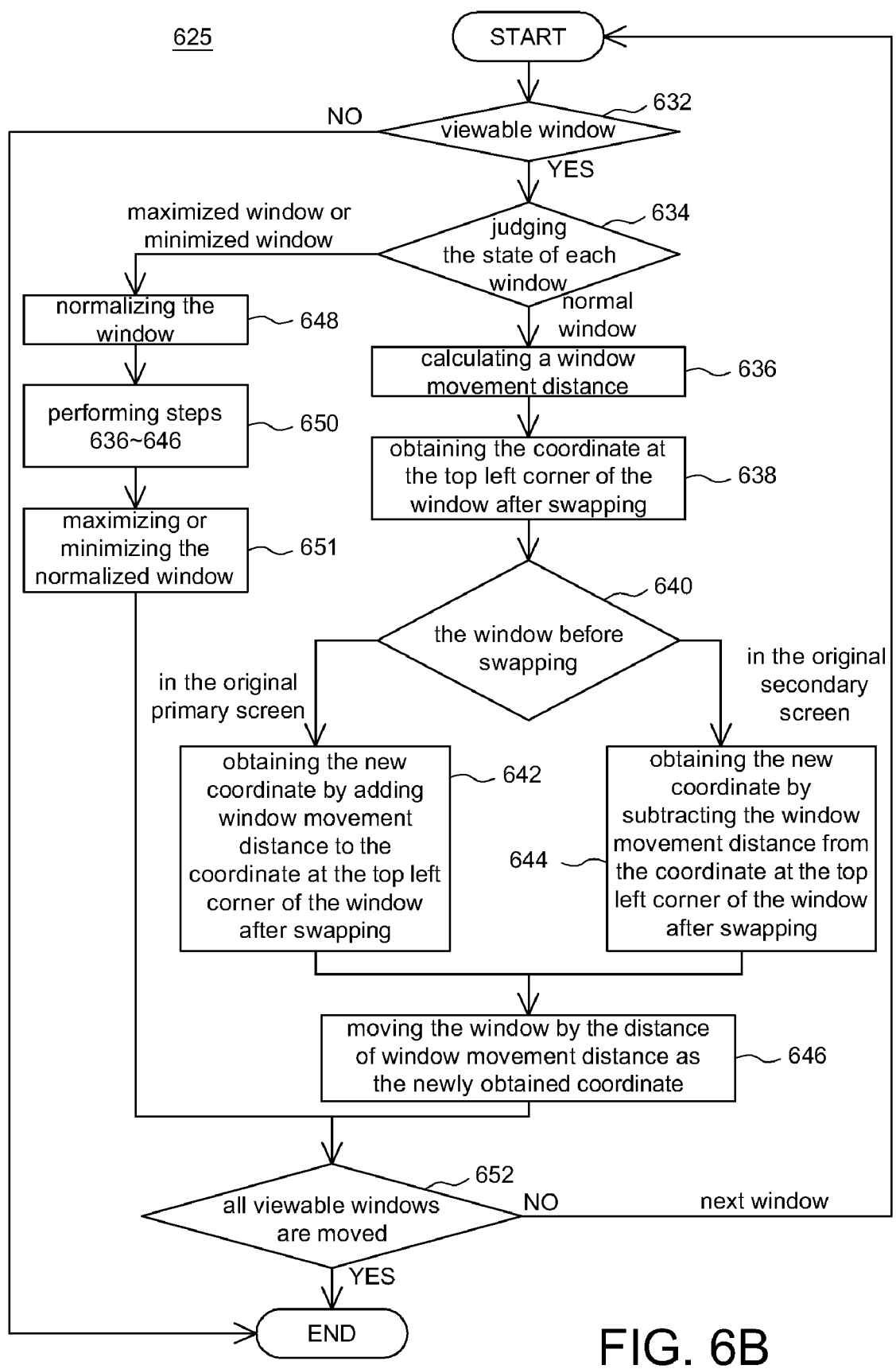

Referring to FIG. 6A, an operating process according to the embodiment of the invention is shown. As indicated in FIG. 6A, in step 610, an instruction of swapping is received. Then, in step 615, a relative position between multiple screens and the respective resolution of all screens are identified. Then, in step 620, a foreground window is identified, i.e. the original display sequence of all windows is recorded. Then, in step 625, the viewable windows are moved. The details of the step 625 is indicated in FIG. 6B and is disclosed below. After all viewable windows are moved, the display sequence of all viewable windows would be interrupted, so the foreground window is set in step 660. That is, the display sequence of all moved viewable windows is reset according to the display sequence recorded in step 620, so that all the viewable windows are displayed in the same sequence before and after swapping. Thus, the user can continue to use the current window without having to locate the current window from all viewable windows.

Referring to FIG. 6B, whether each window is viewable is judged (step 632). If none of the window is viewable, the process terminates, otherwise the state of each viewable window is judged (step 634). If the state is normal (neither maximized nor minimized), the process proceeds to step 636. If the state is maximized or minimized, the process proceeds to step 648.

As for normal viewable windows, the normal viewable windows are moved (step 636~646). In step 636, a window movement distance is calculated, wherein the details are already disclosed above and are not repeated here. Then, in step 638, the coordinate (Px, $Py_{(AS)}$) at the top left corner of the window is obtained, wherein the details are already disclosed above and are not repeated here. Then, in step 640, whether the window before swapping is located in the original primary screen or in the original secondary screen is judged. If the window before swapping is located in the original primary screen, then the new coordinate (P'x, P'y) of the window is obtained by adding the window movement distance to the coordinate (Px, $Py_{(AS)}$) at the top left corner of the window after swapping (step 642). If the window before swapping is located in the original secondary screen, then the new coordinate (P'x, P'y) of the window is obtained by subtracting the window movement distance from the coordinate (Px, $Py_{(AS)}$) at the top left corner of the window after swapping (step 644). Then, in step 646, the window is moved by the distance of window movement distance as the newly obtained coordinate.

As for the maximized windows or the minimized windows, the window needs to be normalized first, that is, the window need to be restored (normalized) as a normal viewable window (step 648). Then, the process proceeds to step 650 to move the window. Step 650 includes steps 636~646 and the details are not repeated here. Then, in step 651, these normalized windows are restored back as the maximized windows or the minimized windows. Lastly, in step 652, whether all viewable windows are moved is judged.

Thus, when the user performs "swapping primary screen", the window will be moved accordingly, the window originally displayed on the original primary screen will be moved to the new primary screen, and the window originally displayed on the original secondary screen will be moved to the new secondary screen. Besides, the embodiment of the invention further judges whether each window is a viewable window to save computing resources, and the display sequence of the viewable windows are recorded for keeping the display sequence of the viewable windows from being interrupted.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for swapping display contents between a first screen and a second screen, wherein the first screen is a primary screen, a window is displayed on one of the first screen and the second screen, the method comprising:
   (a) calculating a window movement distance according to a relative position between the first screen and the second screen;
   (b) performing swapping to set the second screen as the primary screen;
   (c) obtaining a coordinate of the window after swapping;
   (d) obtaining a first coordinate by adding the window movement distance to the coordinate of the window after swapping if the window is located in the first screen before swapping;
   (e) obtaining a second coordinate by subtracting the window movement distance from the coordinate of the window after swapping if the window is located in the second screen before swapping; and
   (f) moving the window from one of the first screen and the second screen to the other according to the first coordinate or the second coordinate.

2. The method according to claim 1, wherein, the step (a) further comprises:
   identifying respective resolution of the first screen and the second screen.

3. The method according to claim 1, the method further comprises:
   recording an original display sequence of all windows.

4. The method according to claim 1, wherein, further comprises:
   if the window is a maximized window or a minimized window, then:
      restoring the window as a normal viewable window;
      moving the window; and
      restoring the window back as the maximized window or the minimized window.

5. The method according to claim 1, wherein, the window is a viewable window.

6. A method for swapping display contents between multiple screens, the method comprising:
   (a) receiving a swapping instruction;
   (b) identifying a relative position between the screens and respective resolution of each screen;
   (c) recording an original display sequence of viewable windows display;
   (d) moving all viewable windows displayed on each screen;

(d1) calculating a window movement distance according to the relative position;
(d2) performing swapping;
(d3) obtaining a coordinate of the viewable window after swapping;
(d4) obtaining a first coordinate by adding the window movement distance to the coordinate of the viewable window after swapping if the viewable window before swapping is located in a primary screen;
(d5) obtaining a second coordinate by subtracting the window movement distance from the coordinate of the viewable window after swapping if the viewable window before swapping is not located in the primary screen; and
(d6) moving the viewable window according to the first coordinate or the second coordinate; and
(e) setting the moved viewable windows according to the recorded original display sequence.

7. The method according to claim 6, wherein, the step (d1) further comprises: identifying respective resolution of the first screen and the second screen.

8. The method according to claim 6, further comprising:
if the viewable window is a maximized window or a minimized window, then:
restoring the viewable window as a normal viewable viewable window;
moving the viewable window; and
restoring the viewable window back as the maximized window or the minimized window.

* * * * *